Patented July 9, 1935

2,007,340

UNITED STATES PATENT OFFICE 2,007,340

COFFEE RESISTANT TO URN DETERIORATION

Erik Rosenberg Nielsen, Chicago, Ill., assignor to Carl S. Miner, Chicago, Ill.

No Drawing. Application September 16, 1933, Serial No. 689,796

9 Claims. (Cl. 99—11)

My invention relates to a new and novel method of preventing deterioration in coffee brews and a deterioration resistant coffee.

One of the objects of my invention is to produce coffee for restaurant and hotel use which shall have improved keeping quality in the urn.

A further object of my invention is to produce a coffee blend comprising an inhibitor capable of preventing or delaying deterioration of the brew during the period of holding the coffee brew in the urn.

It is well known that coffee brews deteriorate in flavor rather rapidly, especially when held at the customary elevated temperatures. This deterioration in flavor appears to involve two types of changes: (1) the loss of volatile flavoring materials from the brew, and (2) the generation of compounds of unpleasant flavor through chemical reactions taking place in the coffee extract. These facts are not ordinarily of importance in connection with the use of coffee in the home when coffee is consumed within a very short time after being prepared. In restaurants and hotels, however, when considerable quantities of coffee brew are made at one time, the problem is an extremely serious one, since all coffee brews heretofore known deteriorate in the urn, and some of those blends of most desirable initial flavor change so rapidly that they may become absolutely nauseating in as short a time as one hour.

Various expedients have been tried for overcoming this difficulty. A common and very expensive method is to brew only small quantities, sometimes as little as one or two cups at a time. Another method is to roast the blend of coffee to a point far short of the point where its most desirable flavor is developed, experience having shown that such coffees retain their initial flavor longer in the brew, although they are much less desirable in flavor than the high roast coffees which deteriorate so rapidly in the urn. However, since this initial flavor is not highly desirable, very little is gained by utilizing this expedient.

Early in my investigation of this problem I discovered that deterioration of the brewed coffee was roughly proportional to the development of acidity, and by acidity I mean chemical acidity as measured, for example, by the quinhydrone electrode. I do not means to be understood as suggesting that the undesirable flavor is primarily the acidity, since this as far from true, a certain acid flavor in coffee brews being on the whole desirable. I merely mean that I have found that for a given brew the increase in acidity was proportional to deterioration of flavor.

I have also found that the urn resistance of a given coffee decreased as the degree of roast was increased, and that this was proportional to a decrease in acidity likewise, so that, for instance, a medium roasted coffee would be more acid than a highly roasted coffee and the medium roast would be relatively more urn resistant although of less pleasing initial flavor.

I then conceived the idea that if a suitable degree and type of acidity were present initially the tendency to further acid formation and concomitant development of undesirable flavor might be inhibited. I tried acid agents for this purpose, such as citric and maleic acid, but without any favorable effect. I also tried other acid agents for the purpose inhibiting acid development, but in no instance did they delay the development of acidity and undesirable flavor appreciably. I thereupon conceived the idea of utilizing in the blend a suitable proportion of coffee itself roasted so as to produce in it an acid substance inhibitory to flavor deterioration. This plan proved highly successful, for I found that by adding to the blend a small quantity of a coffee roasted to the point where substantially the maximum acidity had been developed, a highly deterioration-resistant coffee was produced. This point of maximum acidity of the roasted coffee is generally reached at about the same degree of roast for the different types of raw coffee beans and coincides approximately with the stage of the roasting where the beans start to pop. At this point of maximum acidity the normal coffee flavor has not yet been developed, and brews made from this low roast coffee alone are thoroughly unsatisfactory for drinking.

It is to be understood that this criterion of initial popping is suggested merely as a convenient though only approximate test for factory use. The most accurate method of determining the point of development of maximum inhibiting effect is to determine the point where maximum chemical acidity is developed in the roasted beans. A relatively simple but less accurate method for determining this point is to determine for any given type or blend the apparent specific gravity of the beans when roasted to maximum acidity and to use this test—i. e., determination of apparent specific gravity—as a method of controlling the roasting operation in the plant. A convenient method of making this apparent specific gravity determination is to fill a vessel with the roasted beans and compare their weight with the weight of the amount of water the same vessel will hold.

In studying the use of low roast coffees as inhibitors, I have investigated a great number of types of coffee. In each case I have prepared several roasts of different chemical acidity, including the one showing the maximum chemical acidity, and have studied their effectiveness as inhibitors for preventing the deterioration of a high roast blend when kept hot in the urn. These studies disclosed the following facts: That for each type of coffee the best inhibitor was the roast which showed the maximum chemical acidity for that type of coffee, but the type of coffee showing the highest maximum acidity was not necessarily the best inhibitor.

Most of the so-called "mild" coffees which were tested were found to be more or less effective as inhibitors, whereas Santos #4, for example, was found to be relatively ineffective for this purpose. I have found the following coffees to be highly effective inhibitors: Manizales and Bogota. The following coffees I have found to be effective in somewhat lesser degree: Medellin, Sevilla, Coatepec, and Ankola. The following coffees I have found to be only slightly effective: Cucuta, Bucaramanga, and Armenia. The following coffees I have found to be relatively ineffective: Santos #4, Mocha, and Libano.

The quantity of inhibitor which should be added to a high roast in order to obtain good urn resistance depends mainly on two factors: (a) the effectiveness as inhibitors of the coffee or coffees used in the low roast, and (b) the degree of roast of the high roast in that the higher the high roast, the more low roast inhibitor should be used in order to get the same urn resistance. Generally speaking, a blend of good urn resistance should contain from twenty-five to thirty-five percent of low roast coffee—i. e., coffee roasted only to maximum acidity. It should be understood, of course, that I do not limit myself to the coffees mentioned above as being effective inhibitors. It is reasonable to believe that many other coffees not investigated will prove to be effective inhibitors also, and I have provided the described effective means of determining their inhibiting value—i. e., comparison of their inhibiting effect when roasted to the point where maximum acidity has been developed.

My method of preparing deterioration-resistant coffee has peculiar advantages, since it is possible by this method to utilize in the blend a major portion, for example 70% of a coffee highly roasted to a point where its optimum and maximum flavor have been developed (such coffee being especially liable to rapid urn deterioration), and to render this coffee deterioration-resistant by blending with it a minor portion, for example 30% of low roast coffee of substantially maximum acidity. I am thus able to produce a coffee especially desirable for the restaurant and hotel trade, since it will have a highly agreeable flavor and at the same time will be exceptionally resistant to urn deterioration—a combination of characteristics not possible to produce by methods known to the art heretofore.

It is to be understood that although, as I have stated above, the deterioration inhibiting effect of a coffee reaches a maximum at the point where the roasting has produced a maximum acidity in the coffee and it appears highly probable from this fact that the deterioration inhibiting substance is of an acid nature, I am fully aware that the actual inhibiting substance may not be of an acid nature but may consist of one or more compounds not of an acid nature but developed simultaneously with and in proportion to the development of the acid.

Further modifications of this invention will be apparent to those skilled in this art, and it is desired, therefore, that my invention be limited only by the showing of the prior art and the scope of the appended claims.

I claim:

1. A method of preparing deterioration-resistant coffee which comprises roasting coffee only to the point where substantially its maximum acidity is produced and adding it to more highly roasted coffee.

2. A deterioration-resistant coffee comprising a major portion of coffee roasted to substantially optimum flavor and a minor portion of coffee roasted to substantially maximum acidity.

3. A deterioration-resistant coffee comprising a major portion of highly roasted coffee and a minor portion of coffee roasted to substantially maximum acidity.

4. A deterioration-resistant coffee comprising 65% to 75% of high roast coffee and 25% to 35% of coffee roasted to substantially maximum acidity.

5. A method of preparing a deterioration-resistant coffee which comprises roasting coffee approximately to the point where popping takes place and blending this coffee with more highly roasted coffee.

6. A deterioration-resistant coffee comprising coffee roasted to the point of substantially optimum flavor and coffee roasted approximately to the point where popping takes place.

7. A deterioration-resistant coffee comprising a major portion of coffee roasted to the point of substantially optimum flavor and a minor portion of coffee roasted approximately to the point where popping takes place.

8. A deterioration-resistant coffee comprising 65% to 75% of coffee roasted to the point of substantially optimum flavor and 25% to 35% of coffee roasted approximately to the point where popping takes place.

9. A method of producing deterioration-resistant coffee which comprises preparing separately a batch of high roast coffee and a batch of coffee roasted to substantially its maximum acidity and subsequently mixing the two batches.

ERIK R. NIELSEN.